United States Patent
Reynolds et al.

(10) Patent No.: US 11,772,417 B1
(45) Date of Patent: Oct. 3, 2023

(54) PADDLE TIRE

(71) Applicant: Sandcraft LLC, Phoenix, AZ (US)

(72) Inventors: Brent G. Reynolds, Peoria, AZ (US); Jonathan D. Roberts, Peoria, AZ (US)

(73) Assignee: SANDCRAFT, LLC., Phoenix, AZ (US)

( * ) Notice: Subject to any disclaimer, the term of this patent is extended or adjusted under 35 U.S.C. 154(b) by 0 days.

(21) Appl. No.: 17/891,081

(22) Filed: Aug. 18, 2022

(51) Int. Cl.
   *B60B 15/08* (2006.01)
   *B60C 27/20* (2006.01)
   *B60B 15/02* (2006.01)

(52) U.S. Cl.
   CPC .............. *B60B 15/08* (2013.01); *B60B 15/02* (2013.01); *B60C 27/20* (2013.01)

(58) Field of Classification Search
   CPC ......... B60C 27/20; B60C 27/02; B60C 27/04; B60B 15/02; B60B 15/021; B60B 15/023; B60B 15/025; B60B 15/08
   See application file for complete search history.

(56) References Cited

U.S. PATENT DOCUMENTS

| | | | | |
|---|---|---|---|---|
| 2,608,232 A * | 8/1952 | Kennedy | ................. | B60C 27/16 152/221 |
| 3,628,493 A * | 12/1971 | Headrick | .............. | B60F 3/0015 440/12.7 |
| 4,791,971 A * | 12/1988 | Shinn | .................. | B60C 11/0311 152/209.12 |
| 5,375,640 A * | 12/1994 | Harms | ................. | B60C 11/0316 152/209.15 |
| 7,762,296 B2 * | 7/2010 | Ganz | .................... | B60C 11/0316 152/902 |
| 8,196,626 B2 * | 6/2012 | Lo | ........................ | B60C 11/0311 152/209.8 |
| 8,826,953 B2 * | 9/2014 | Pringiers | ................... | B60C 7/24 152/323 |
| 9,221,310 B1 * | 12/2015 | Cameron | ................ | B60C 27/20 |
| 10,899,169 B2 * | 1/2021 | Schaedler | ................ | B60C 7/24 |
| 11,241,908 B2 * | 2/2022 | Mansfield | ............... | B60C 27/16 |
| 2017/0036482 A1 * | 2/2017 | Hird | ........................ | B60B 15/02 |

FOREIGN PATENT DOCUMENTS

JP        59073301 A  * 10/1982  .......... B60B 15/021

* cited by examiner

*Primary Examiner* — Jason R Bellinger
(74) *Attorney, Agent, or Firm* — BOOTH UDALL FULLER, PLC; Pacer K. Udall (57) ABSTRACT

A paddle tire with a tire body and a plurality of paddles. The tire body has a right sidewall, a left sidewall, and an outer surface joining the right sidewall to the left sidewall. The paddles are affixed to the outer surface at discrete intervals around a circumference of the tire body and alternate between left-side paddles and right-side paddles. A right portion of each right-side paddle adjacent the right sidewall of the tire body has a first height and a left portion of each right-side paddle distal to the right sidewall of the tire body has a second height. A left portion of each left-side paddle adjacent the left sidewall of the tire body has a first height and a right portion of each left-side paddle distal to the left sidewall of the tire body has a second height. The second height is less than the first height.

19 Claims, 10 Drawing Sheets

PADDLE TIRE

TECHNICAL FIELD

Aspects of this document relate generally to paddle tires, and more specifically to paddle tires with alternating right- and left-side paddles.

BACKGROUND

Paddle tires are used on off-road vehicles that are driven through fluid-like terrain such as sand or mud. Paddle tires provide better traction in such terrain than typical tires do. Some paddle tires implement an alternating pattern where every other paddle is aligned to the left-side or the right-side of the tire.

SUMMARY

Aspects of this document relate to a paddle tire comprising a tire body having a right sidewall, a left sidewall opposite the right sidewall, and a cylindrical textured outer surface joining the right sidewall to the left sidewall, and a plurality of paddles affixed to the outer surface of the tire body at discrete intervals around a circumference of the tire body, wherein the plurality of paddles comprises left-side paddles and right-side paddles, each paddle of the plurality of paddles is separated from adjacent paddles, and the plurality of paddles alternates between left-side paddles and right-side paddles around the circumference of the tire body, wherein each right-side paddle extends transversely across the outer surface of the tire body, a right portion of the right-side paddle adjacent the right sidewall of the tire body having a first height and a left portion of the right-side paddle distal to the right sidewall of the tire body having a second height less than the first height, wherein the right portion of the right-side paddle is longer than the left portion of the right-side paddle, and wherein each left-side paddle extends transversely across the outer surface of the tire body, a left portion of the left-side paddle adjacent the left sidewall of the tire body having a first height and a right portion of the left-side paddle distal to the left sidewall of the tire body having a second height less than the first height, wherein the left portion of the left-side paddle is longer than the right portion of the left-side paddle.

Particular embodiments may comprise one or more of the following features. Each paddle of the plurality of paddles may comprise a scoop portion with a concave curved surface. The second height of the right-side paddle may be less than or equal to half of the first height of the right-side paddle, and the second height of the left-side paddle may be less than or equal to half of the first height of the left-side paddle. The right portion of the right-side paddle may be at least twice as long as the left portion of the right-side paddle, and the left portion of the left-side paddle may be at least twice as long as the right portion of the left-side paddle.

Aspects of this document relate to a paddle tire comprising a tire body having a right sidewall, a left sidewall opposite the right sidewall, and an outer surface joining the right sidewall to the left sidewall and a plurality of paddles affixed to the outer surface of the tire body at discrete intervals around a circumference of the tire body, the plurality of paddles comprising left-side paddles and right-side paddles, wherein the plurality of paddles alternates between left-side paddles and right-side paddles around the circumference of the tire body, wherein each right-side paddle extends transversely across the outer surface of the tire body, a right portion of the right-side paddle adjacent the right sidewall of the tire body having a first height and a left portion of the right-side paddle distal to the right sidewall of the tire body having a second height less than the first height, and wherein each left-side paddle extends transversely across the outer surface of the tire body, a left portion of the left-side paddle adjacent the left sidewall of the tire body having a first height and a right portion of the left-side paddle distal to the left sidewall of the tire body having a second height less than the first height.

Particular embodiments may comprise one or more of the following features. A centerline of each right-side paddle and of each left-side paddle may be offset from a centerline of the tire body. Each paddle of the plurality of paddles may be separated from adjacent paddles. The right portion of the right-side paddle may be longer than the left portion of the right-side paddle and the left portion of the left-side paddle may be longer than the right portion of the left-side paddle. Each paddle of the plurality of paddles may comprise a scoop portion with a concave curved surface. The second height of the right-side paddle may be less than or equal to half of the first height of the right-side paddle, and the second height of the left-side paddle may be less than or equal to half of the first height of the left-side paddle. The right portion of the right-side paddle may be at least twice as long as the left portion of the right-side paddle, and the left portion of the left-side paddle may be at least twice as long as the right portion of the left-side paddle.

Aspects of this document relate to a paddle tire comprising a tire body having a first sidewall, a second sidewall opposite the first sidewall, and an outer surface joining the first sidewall to the second sidewall, and a plurality of paddles affixed to the outer surface of the tire body around a circumference of the tire body, the plurality of paddles comprising left-side paddles and right-side paddles, wherein each right-side paddle extends over the outer surface of the tire body, a first portion of the right-side paddle adjacent the first sidewall of the tire body having a first height and a second portion of the right-side paddle distal to the first sidewall of the tire body having a second height different from the first height, and wherein each left-side paddle extends over the outer surface of the tire body, a first portion of the left-side paddle adjacent the second sidewall of the tire body having a first height and a second portion of the left-side paddle distal to the second sidewall of the tire body having a second height different from the first height.

Particular embodiments may comprise one or more of the following features. The plurality of paddles may alternate between left-side paddles and right-side paddles around the circumference of the tire body. Each paddle of the plurality of paddles may extend transversely across the outer surface of the tire body. The second height of the right-side paddle may be less than the first height of the right-side paddle, and the second height of the left-side paddle may be less than the first height of the left-side paddle. A centerline of each right-side paddle and of each left-side paddle may be offset from a centerline of the tire body. The first portion of the right-side paddle may be longer than the second portion of the right-side paddle and the first portion of the left-side paddle may be longer than the second portion of the left-side paddle. Each paddle of the plurality of paddles may comprise a scoop portion with a concave curved surface. The second height of the right-side paddle may be less than or equal to half of the first height of the right-side paddle, and the second height of the left-side paddle may be less than or equal to half of the first height of the left-side paddle. The first portion of the right-side paddle may be at least twice as long as the second portion of the right-side paddle, and the first portion of the left-side paddle may be at least twice as long as the second portion of the left-side paddle.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure is related to a paddle tire 100 with a tire body 102 and a plurality of paddles 104. The paddle tire 100 is configured for use on off-road vehicles, especially when used in sand, snow, cinders, loose friction terrain, or mud. For example, the paddle tire 100 may be used on vehicles such as UTVs, such as the Polaris RZR. As used herein, UTVs include utility terrain vehicles and universal task vehicles. The paddle tire 100 may also be used on four-wheel drive vehicles, two-wheel drive vehicles, sandrails, dune buggies, all-terrain vehicles (ATV), trucks, off-road vehicles, on-road vehicles, sport utility vehicles, recreational vehicles, defense vehicles, race vehicles, competition type vehicles, or other similar vehicles, whether or not the vehicle is street legal, and whether the vehicle is powered by gasoline combustion engines, pre-detonation or diesel engines, or other engines using propane, natural gas, or any other fuel, as well as vehicles powered by electric motors. As such, the paddle tires 100 disclosed herein are applicable to the Polaris RZR platforms and are also applicable to UTVs and other vehicles as well.

Figure 1:
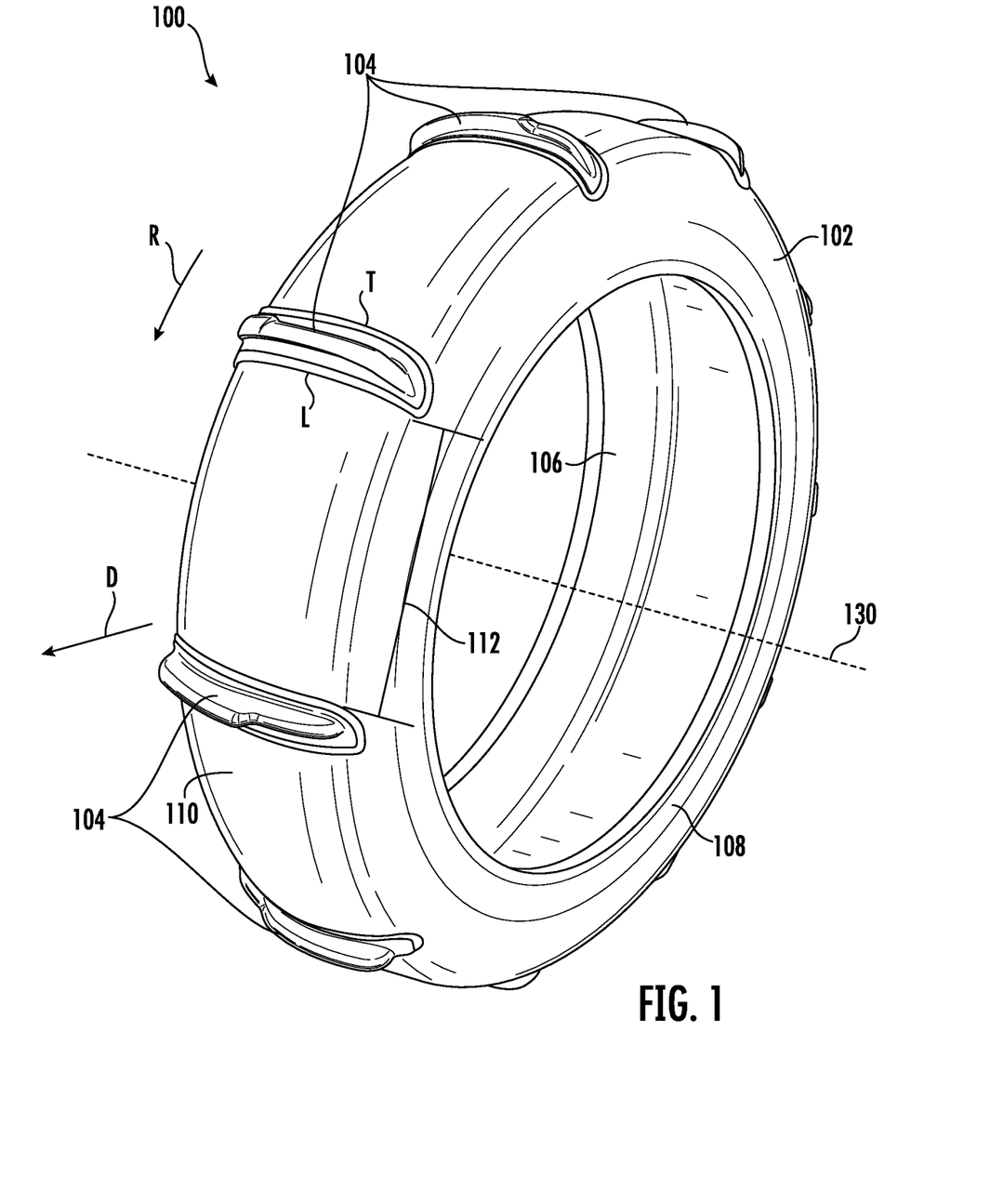
FIG. 1 is a perspective view of a paddle tire.
Figure 2A:
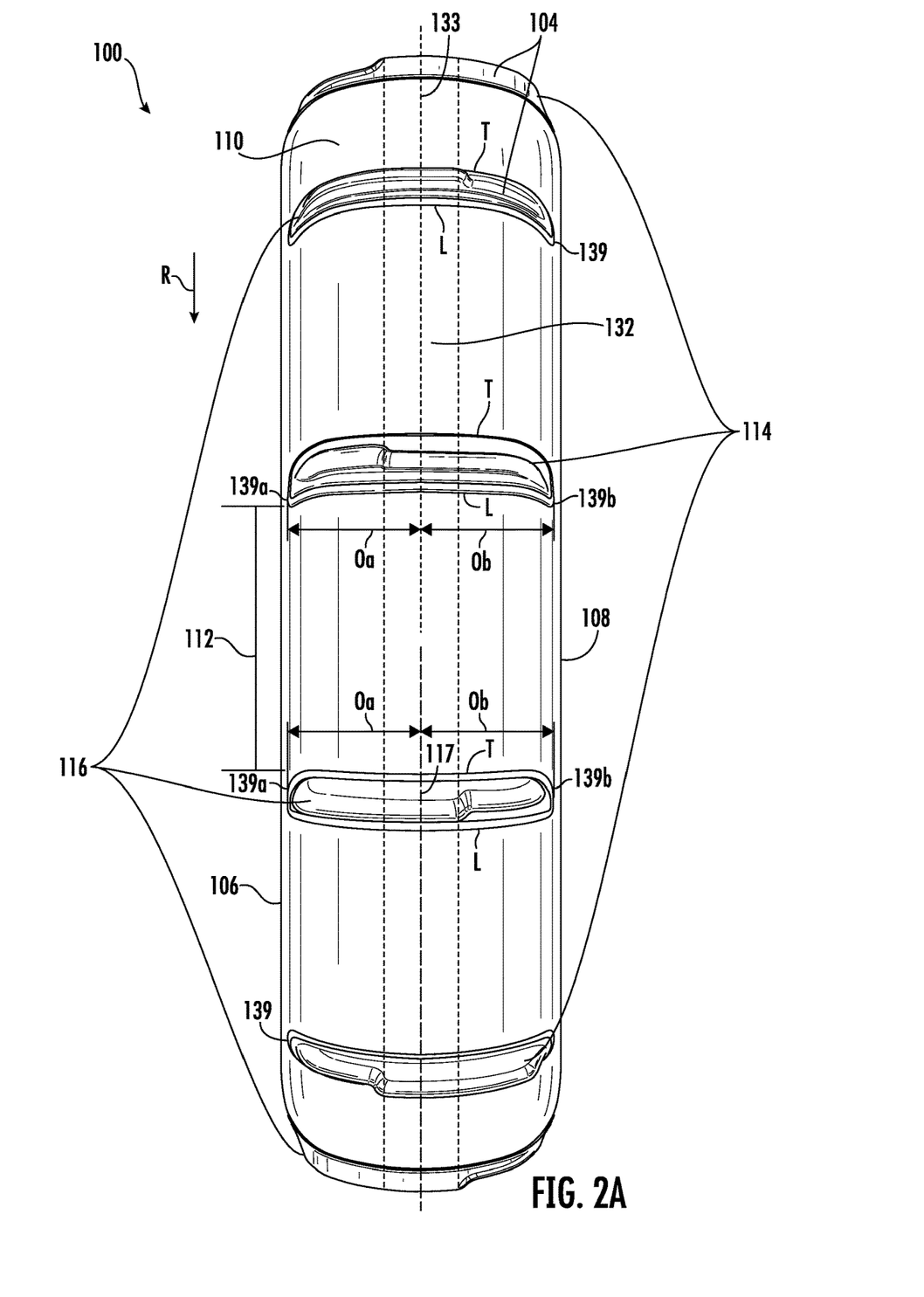
FIG. 2A is a front view of the paddle tire shown in FIG. 1.
Figure 2B:
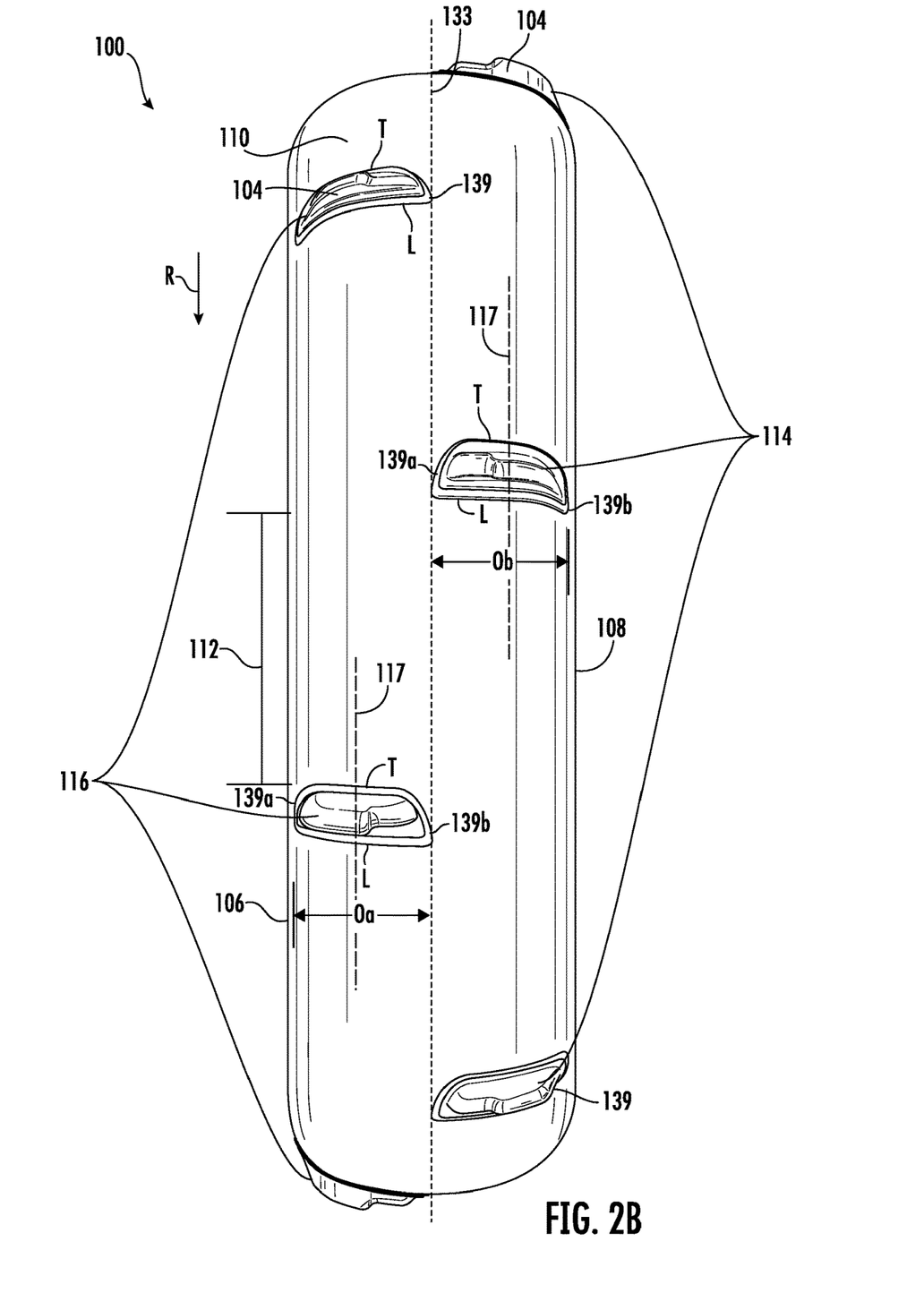
FIG. 2B is a front view of a paddle tire with paddles having centerlines that are offset from the centerline of the tire body.
Figure 3:
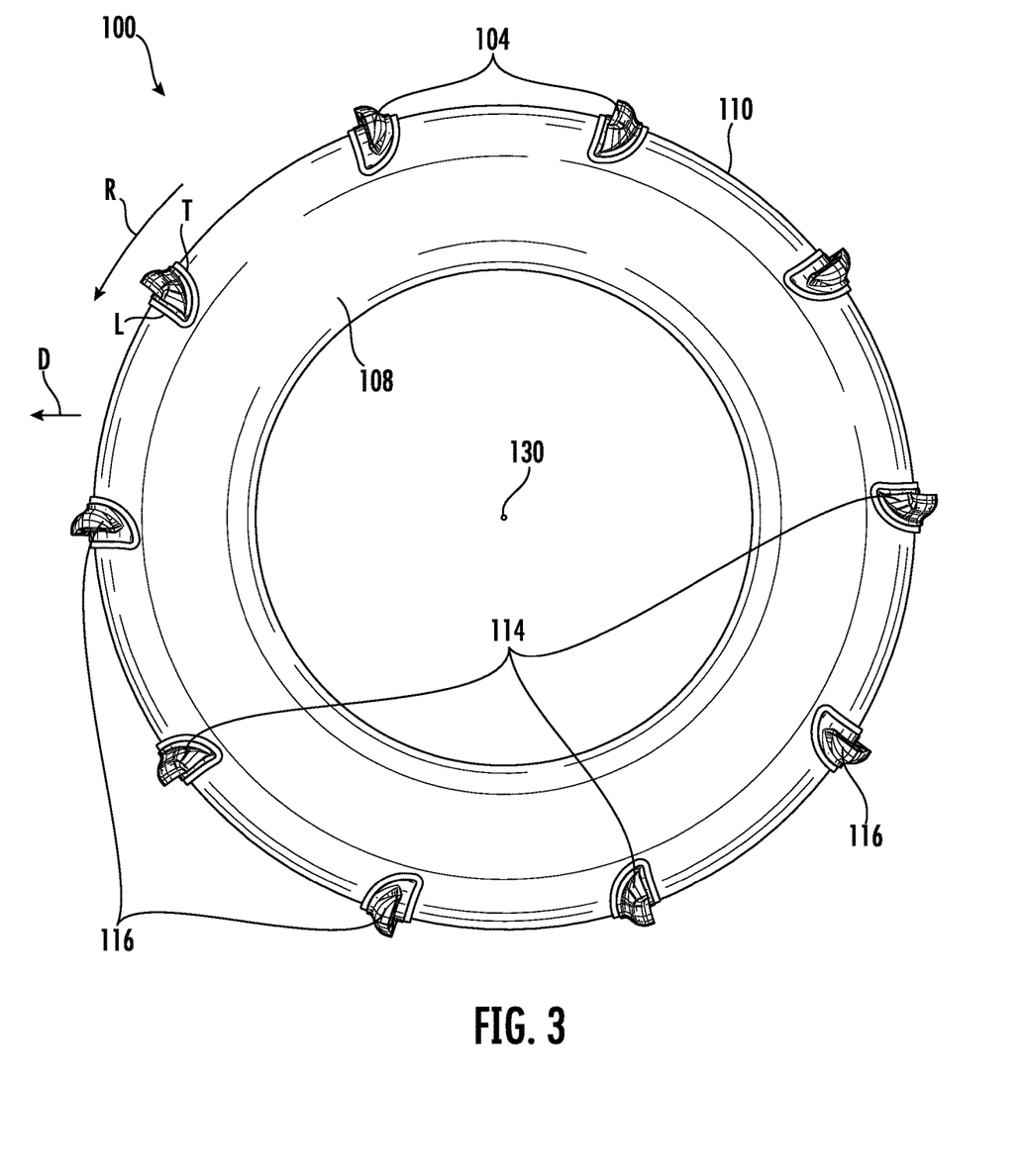
FIG. 3 is a side view of the paddle tire shown in FIG. 1.

As shown in FIGS. 1-3, the tire body 102 has a right sidewall 106, a left sidewall 108 opposite the right sidewall 106, and an outer surface 110 joining the right sidewall 106 to the left sidewall 108. The left sidewall 108, the right sidewall 106, and the outer surface 110 may surround the axis 130. In some embodiments, the outer surface 110 is generally cylindrical in shape, and may have a curvilinear shape such that the tire body 102 has no sharp corners moving from the right sidewall 106 to the outer surface 110 to the left sidewall 108. Additionally, the outer surface 110 may be textured. The texture on the outer surface 110 may be a roughened texture. The texture may also be some pattern or tread in the outer surface 110. The outer surface 110 may be configured to wear away as the paddle tire 100 is used. As the outer surface 100 wears away, the material that is exposed becomes the outer surface 110.

Figure 4:
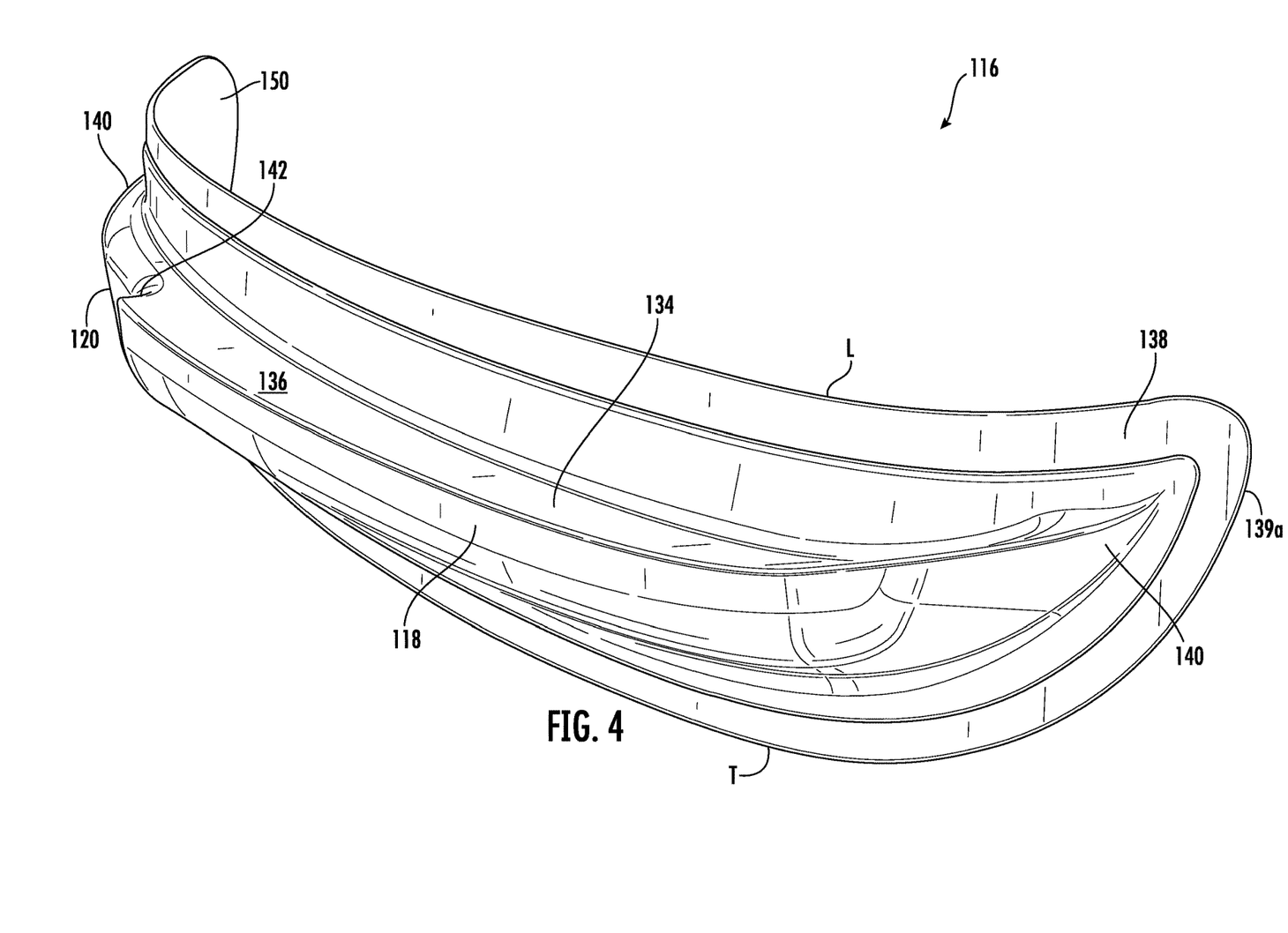
FIG. 4 is a perspective view of a right-side paddle of the paddle tire shown in FIG. 1.
Figure 10:
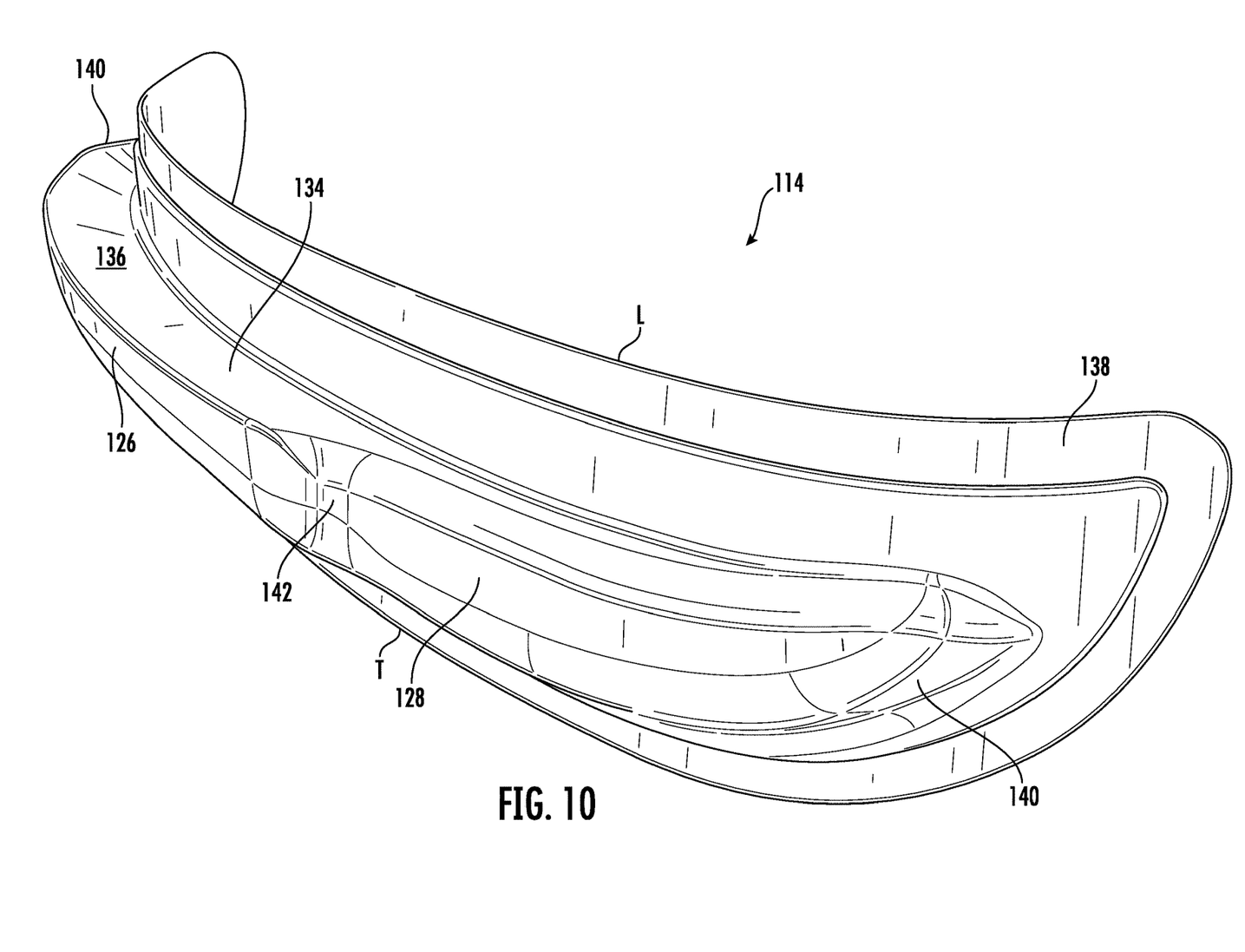
FIG. 10 is a perspective view of a left-side paddle of the paddle tire shown in FIG. 1.

The plurality of paddles 104 are affixed to the outer surface 110 of the tire body 102 around a circumference of the tire body 102. The paddles 104 are configured to provide a forward-propelling force to the paddle tire 100 when the paddle tire 100 is rotated about the axis 130 against a terrain that more transient in nature and thus provides less friction, such as sand or mud as opposed to hard-packed dirt or pavement. The paddle tire 100 may be rotated in the angular direction R shown in FIGS. 1-3. This rotation in turn may cause the tire body 102 to move in a linear direction D. In some embodiments, the plurality of paddles 104 are spaced around the tire body 102 at discrete intervals, where a gap 112 separates each paddle 104 from adjacent paddles 104. The plurality of paddles 104 comprises left-side paddles 114 and right-side paddles 116. The plurality of paddles 104 may alternate between left-side paddles 114 and right-side paddles 116 around the circumference of the tire body 102, as shown in FIGS. 1, 2A, and 2B. Thus, each paddle 104 may have adjacent paddles 104 that are not the same type of paddle 104. For example, a right-side paddle 116 may have two adjacent paddles 104, where each of these adjacent paddles 104 is a left-side paddle 114. Similarly, a left-side paddle 114 may have two adjacent paddles 104, where each is a right-side paddle 116. In some embodiments, the left-side paddles 114 and the right-side paddles 116 are shaped similarly, with the left-side paddles 114 being a mirror image of the right-side paddles 116 (compare FIG. 4 showing a right-side paddle 116 with FIG. 10 showing a left-side paddle 114). Each of the paddles 104 may have a leading edge L configured to face in the direction of angular direction R and a trailing edge T that faces in a direction opposite the angular direction R.

Each right-side paddle 116 may extend transversely across the outer surface 110 of the tire body 102, substantially in an axial direction, as shown in FIG. 1. As shown in more detail in FIGS. 4-10, each right-side paddle 116 has a right portion 118 and a left portion 120. The left portion 120 is distal to the right portion 118, on an opposite end of the paddle 116 from the right portion 118. The right portion 118 of the right-side paddle 116 may be adjacent to the right sidewall 106 of the tire body 102. Additionally, the right portion 118 may have a first height 122 and the left portion 120 may have a second height 124. The second height 124 may be different from the first height 122, and in some embodiments is less than the first height 122. In particular embodiments, the second height 124 of the right-side paddle 116 is less than or equal to half of the first height 122 of the right-side paddle 116. The first height 122 may be selected based on the weight of the vehicle. A larger first height 122 provides increased friction, and thus creates more forward propulsion, which can be helpful for heavier vehicles. The first height 122 may be less than or equal to 2 inches, 3 inches, 4 inches, or 5 inches. Similarly, the second height 124 may be at least ¼ inch, less than or equal to ¼ inch, less than or equal to ½ inch, less than or equal to 1 inch, or less than or equal two 2 inches. For the purposes of this disclosure, any distances disclosed, such as a height or a length, may be +/−5% of the given values or relationships and still be considered within the scope of the disclosure. In other words, such variations are considered equivalents of the disclosed subject matter.

As mentioned above, the left-side paddles 114 may be shaped similar to the right-side paddles 116. Thus, each left-side paddle 114 may also extend transversely across the outer surface 110 of the tire body 102, substantially in an axial direction. Each left-side paddle 114 has a left portion 126 and a right portion 128, where the right portion 128 is distal to the left portion 126, on an opposite end of the paddle 114 from the left portion 126. The left portion 126 of the left-side paddle 114 may be adjacent to the left sidewall 108 of the tire body 102. Additionally, the left portion 126 may have a first height 122 similar to the right portion 118 of the right-side paddle 116, and the right portion 128 may have a second height 124. Just as disclosed above, the second height 124 may be different from the first height 122, and in some embodiments is less than the first height 122. In particular embodiments, the second height 124 of the left-side paddle 114 is less than or equal to half of the first height 122 of the left-side paddle 114.

Returning to FIG. 2A, the right portion 118 of the right-side paddle 116 may be longer than the left portion 120 of the right-side paddle 116 in a direction parallel to the axis 130 of the tire body 102. Thus, the right portion 118 of the right-side paddle 116 extends across a greater portion of the outer surface 110 than the left portion 120 of the right-side paddle 116. Similarly, the left portion 126 of the left-side paddle 114 may be longer than the right portion 128 of the left-side paddle 114 in the direction parallel to the axis 130 of the tire body 102, and the left portion 126 of the left-side paddle 114 extends across a greater portion of the outer surface 110 than the right portion 128. This may create a central band 132 extending around the circumference of the tire body 102 where the right portion 118 of the right-side paddle 116 and the left portion 126 of the left-side paddle 114 of adjacent paddles 104 overlap along the axial direction. The thickness of the central band 132 may influence the performance of the paddle tire 100 because the traction of the tire 100 is affected by the shape of the paddles 104. In some embodiments, the right portion 118 of the right-side paddle 116 is at least twice as long as the left portion 120 of the right-side paddle 116, and the left portion 126 of the left-side paddle 114 is at least twice as long as the right portion 128 of the left-side paddle 114.

Each paddle 104 of the plurality of paddles 104 may comprise a scoop portion 134 adjacent the leading edge L of the paddle 104, as shown in FIGS. 4-10. The scoop portion 134 may be configured to increase the traction of the paddle tire 100. Thus, the scoop portion 134 of each paddle 104 may have a concave curved surface 136. Generally, the scoop portion 134 is contained within the section of the paddle 104 that has the first height 122. However, the scoop portion 134 may also extend into the section of the paddle 104 that has the second height 124. Thus, for the right-side paddles 116, the right portion 118 may contain the majority of the scoop portion 134, while the scoop portion 134 may extend partially into the left portion 120 of the right-side paddles 116, as shown in FIG. 4. Similarly, for the left-side paddles 114, the left portion 126 may contain the majority of the scoop portion 134, while the scoop portion 134 may extend partially into the right portion 128 of the left-side paddles 114, as shown in FIG. 10.

The tire body 102 may have an axial centerline 133 dividing the tire body 102 into two halves, as shown in FIGS. 2A-2B. When the paddles 104 are centered on the tire body 102, the centerline 133 also divides the central band 132 in half. Each of the paddles 104 also has a centerline 117, and when the paddles 104 are centered on the tire body 102, the centerline 117 of the paddle 104 is aligned with the centerline 133 of the tire body 102. Each paddle 104 may have a base 138 with a distal end 139, and each distal end 139 may have an offset between the centerline 133 and the distal end 139. For example, the right distal end 139a may have an offset Oa and the left distal end 139b may have an offset Ob. When the centerline 117 of the paddle 104 is aligned with the centerline 133 of the tire body 102, the offset Oa is equal to the offset Ob. In some embodiments, the centerline 117 is misaligned with or offset from the centerline 133 so that the offset Oa and the offset Ob are not equal to each other (see FIG. 2B). Similarly, in some embodiments, the distal end 139 on the left portion 120 of each right-side paddle 116 is offset from the left sidewall 108 of the tire body 102 and the distal end 139 on the right portion 128 of each left-side paddle 114 is offset from the right sidewall 106 of the tire body 102. In other words, the paddles 104 may not extend completely across the outer surface 110, but instead may begin adjacent one of the right sidewall 106 and the left sidewall 108 and extend only partially across the outer surface 110. In some embodiments, the paddles 104 may extend only halfway across the outer surface 110, terminating at or near the centerline 133 of the tire body 102, as shown in FIG. 2B. The distal end 139 on the left portion 120 of each right-side paddle 116 may be closer to the centerline 133 of the tire body 102 than to the left sidewall 108 of the tire body 102, and the distal end 130 on the right portion 128 of each left-side paddle 114 may be closer to the centerline 133 of the tire body 102 than to the right sidewall 106 of the tire body 102.

Figure 5:
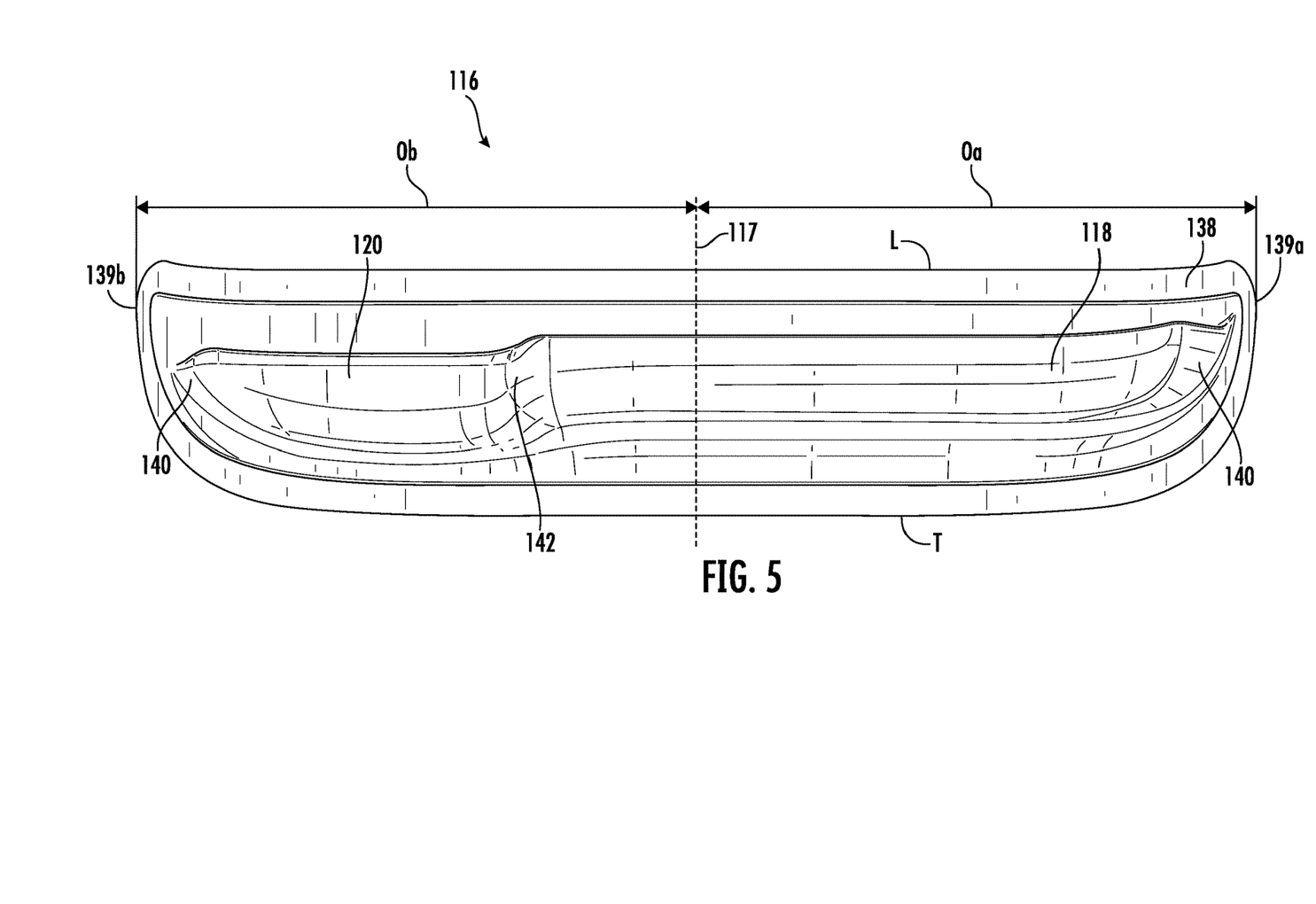
FIG. 5 is a front view of the right-side paddle shown in FIG. 4.
Figure 6:
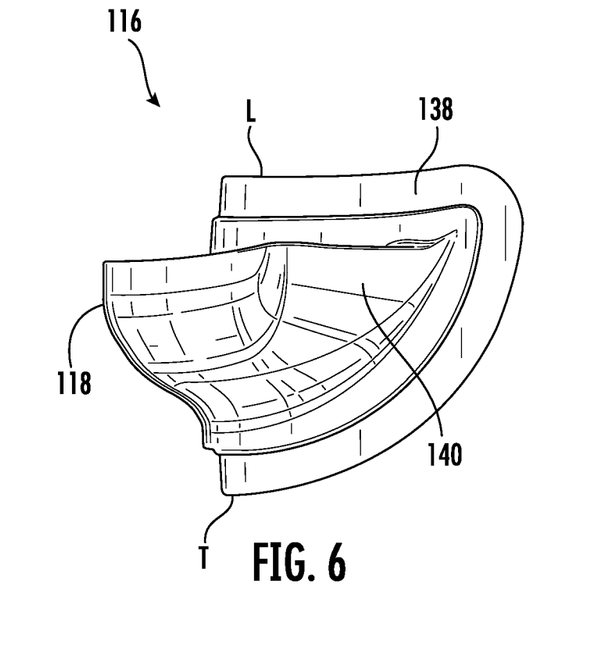
FIG. 6 is a left-side view of the right-side paddle shown in FIG. 4.
Figure 7:
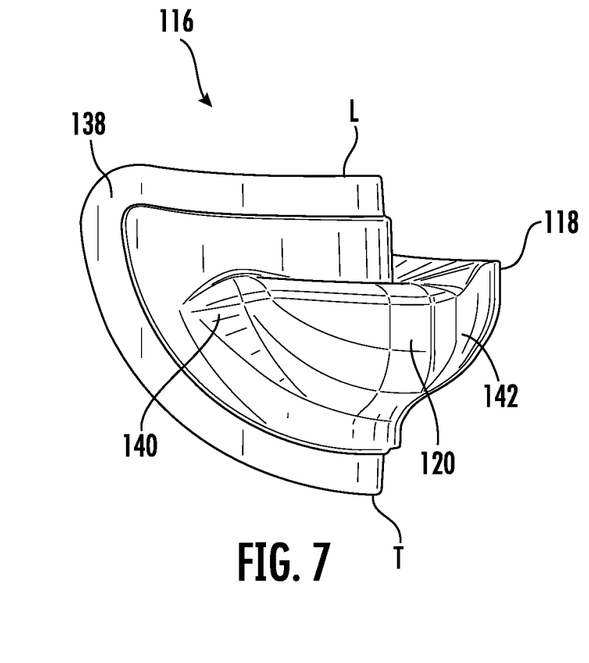
FIG. 7 is a right-side view of the right-side paddle shown in FIG. 4.

Some embodiments of the paddle tire 100 are formed by bonding each paddle 104 to the tire body 102 after the tire body 102 has been formed. The base 138 has a larger footprint on the outer surface 110 of the tire body 102 than the other components of each paddle 104. Thus, as shown in FIGS. 4 and 5, the base may border the other components of the paddle 104 on all sides. The base 138 is configured to provide a larger surface area on the inner surface 150 of the base 138 for bonding the paddle 104 to the tire body 102. The inner surface 150 may be divided by the centerline 117 into a right-side inner surface 150a and a left-side inner surface 150b. In some instance, the right-side inner surface 150a and the left-side inner surface 150b may be symmetrical across the centerline 117. The base 138 may be a thin material. Thus, once the paddle 104 is bonded with the tire body 102, the base 138 may be substantially coplanar with the outer surface 110 of the tire body 102. The remaining components of each paddle 104 may extend radially outward from the base 138 up away from the tire body 102. In such an embodiment, the concave curved surface 136 may curve up from the base 138 along the first height 124 of the right portion 118 of a right-side paddle 116, as shown in FIG. 7, or along the first height 124 of the left portion 126 of a left-side paddle 114.

Figure 8:
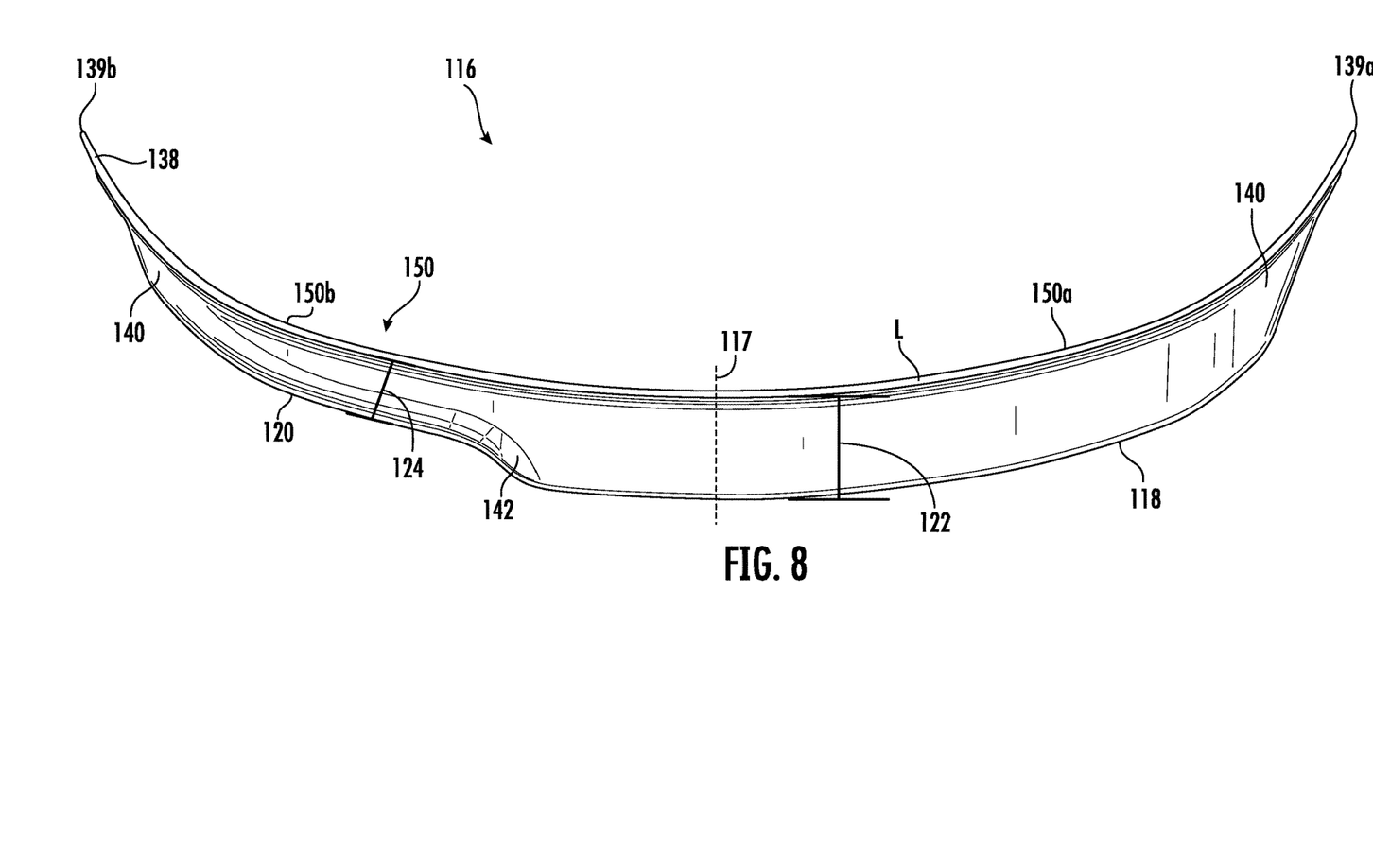
FIG. 8 is a top view of the right-side paddle shown in FIG. 4.
Figure 9:
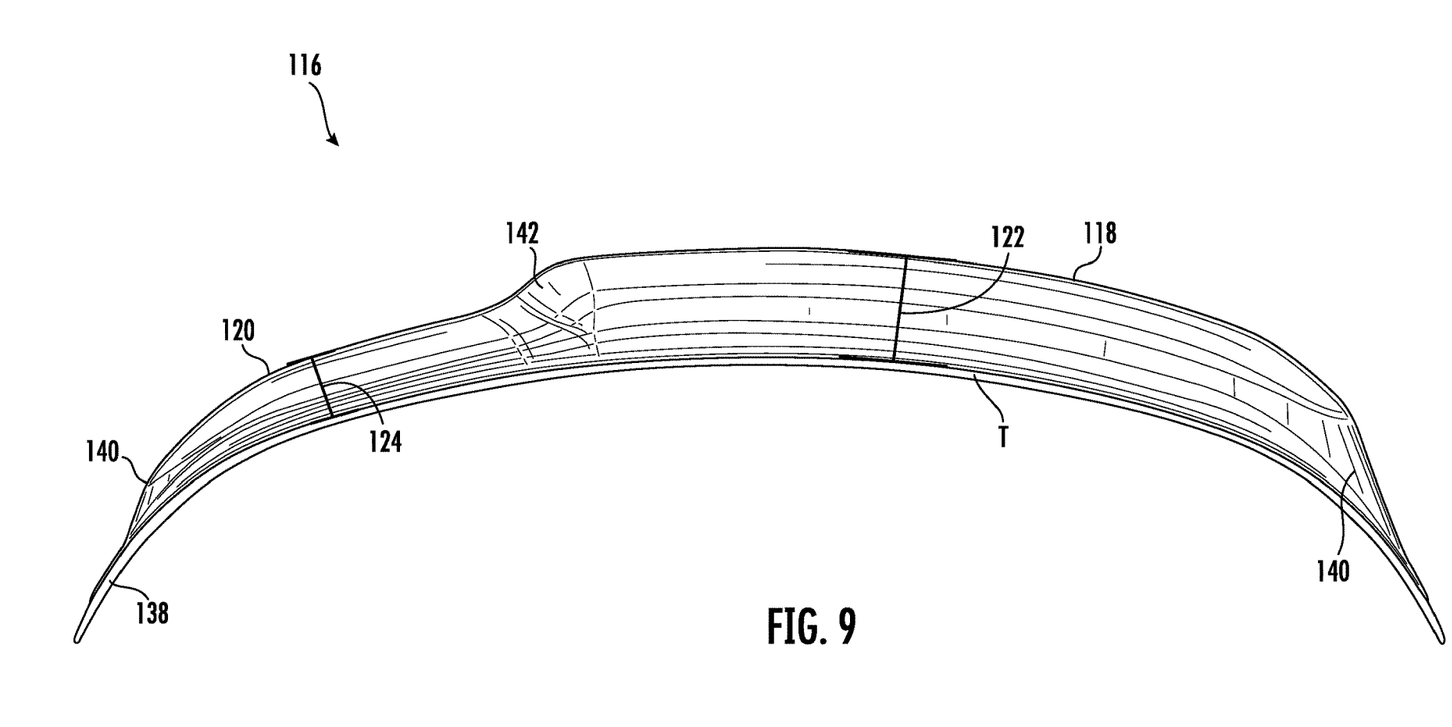
FIG. 9 is a bottom view of the right-side paddle shown in FIG. 4.

Turning specifically to FIGS. 8 and 9, each paddle 104 of the plurality of paddles 104 may have more than just the first height 122 and the second height 124. As shown, each right-side paddle 116 may have tapered ends 140 extending away from the right portion 118 towards the right sidewall 106 and away from the left portion 120 towards the left sidewall 108. Similarly, each left-side paddle 114 may have tapered ends 140 extending away from the left portion 126 towards the left sidewall 108 and away from the right portion 128 towards the right sidewall 106. The tapered ends 140 join the first height 122 and the second height 124 with the base 138 or with the outer surface 110 of the tire body 102. Similarly, each paddle 104 may have a transition height 142 that joins the first height 122 to the second height 124. Thus, each portion of a paddle 104 that has the first height 122 or that has the second height 124 may be bordered on one end by a tapered end 140 and on the other end by a transition height 142. The transition height 142 may have a value between the first height 122 and the second height 124. For example, if the first height 122 is equal to 3 inches and the second height 124 is equal to ¼ inch, the transition height 142 may be between ¼ inch and 3 inches.

It will be understood that implementations of a paddle tire are not limited to the specific assemblies, devices and components disclosed in this document, as virtually any assemblies, devices and components consistent with the intended operation of a paddle tire may be used. Accordingly, for example, although particular paddle tires, and other assemblies, devices and components are disclosed, such may include any shape, size, style, type, model, version, class, measurement, concentration, material, weight, quantity, and/or the like consistent with the intended operation of paddle tires. Implementations are not limited to uses of any specific assemblies, devices and components; provided that the assemblies, devices and components selected are consistent with the intended operation of a paddle tire.

Accordingly, the components defining any paddle tire may be formed of any of many different types of materials or combinations thereof that can readily be formed into shaped objects provided that the materials selected are consistent with the intended operation of a paddle tire. For example, the components may be formed of: rubbers, natural rubber, synthetic rubber, vulcanized rubbers, steel, nylon, silica (derived from sand), polyester, carbon black, petroleum, polyester, rayon, fiberglass, polymers, synthetic rubber polymers, thermosets (such as Epoxy, Silicone, and/or the like), polysiloxane, filler, crosslinker, any combination thereof, and/or other like materials; composites and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various paddle tires may be manufactured using conventional procedures as added to and improved upon through the procedures described here. Some components defining a paddle tire may be manufactured simultaneously and integrally joined with one another, while other components may be purchased pre-manufactured or manufactured separately (such as the tire body 102 and the paddles 104) and then assembled with chemical adhesion, physical adhesion, or both, such as by using chemical adhesives such as glue, tire glue, monkey grip rubber cement, monkey glue, tire repair cement, chemical vulcanizing cement, contact-type adhesive, hot melt glue, welding, ultrasonic welding, heating, laser welding, or other suitable substance or technique. Various implementations may be manufactured using conventional procedures as added to and improved upon through the procedures described here.

Accordingly, manufacture of various components separately or simultaneously separately (such as the tire body 102 and the paddles 104) may involve extrusion, pultrusion, vacuum forming, injection molding, blow molding, transfer molding, casting, rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), any combination thereof, and/or the like for example, depending on, among other considerations, the particular material forming the components.

It will be understood that methods for manufacturing or assembling paddle tires are not limited to the specific order of steps as disclosed in this document. Any steps or sequence of steps of the assembly of a paddle tire indicated herein are given as examples of possible steps or sequence of steps and not as limitations, since various assembly processes and sequences of steps may be used to assemble paddle tires.

The implementations of a paddle tire described are by way of example or explanation and not by way of limitation. Rather, any description relating to the foregoing is for the exemplary purposes of this disclosure, and implementations may also be used with similar results for a variety of other applications employing a paddle tire.

What is claimed is:

1. A paddle tire, comprising:
a pneumatic tire body having a solid right sidewall, a solid left sidewall opposite the right sidewall, and a cylindrical textured outer surface joining the right sidewall to the left sidewall; and
a plurality of paddles integrally bonded to the outer surface of the tire body at discrete intervals around a circumference of the tire body, wherein the plurality of paddles comprises left-side paddles and right-side paddles, each paddle of the plurality of paddles is separated from adjacent paddles, the plurality of paddles alternates between left-side paddles and right-side paddles around the circumference of the tire body, and wherein each paddle of the plurality of paddles comprises a scoop portion with a concave curved surface;
wherein each right-side paddle extends transversely across the outer surface of the tire body, a right portion of the right-side paddle adjacent the right sidewall of the tire body having a first height and a left portion of the right-side paddle distal to the right sidewall of the tire body having a second height less than the first height, wherein the right portion of the right-side paddle is longer than the left portion of the right-side paddle;
wherein each left-side paddle extends transversely across the outer surface of the tire body, a left portion of the left-side paddle adjacent the left sidewall of the tire body having a first height and a right portion of the left-side paddle distal to the left sidewall of the tire body having a second height less than the first height, wherein the left portion of the left-side paddle is longer than the right portion of the left-side paddle; and
wherein the paddle tire has greater traction when rotating in a first direction than when rotating in a second direction opposite the first direction.

2. The paddle tire of claim 1, wherein the second height of the right-side paddle is less than or equal to half of the first height of the right-side paddle, and the second height of the left-side paddle is less than or equal to half of the first height of the left-side paddle.

3. The paddle tire of claim 1, wherein the right portion of the right-side paddle is at least twice as long as the left portion of the right-side paddle, and the left portion of the left-side paddle is at least twice as long as the right portion of the left-side paddle.

4. A paddle tire, comprising:
a pneumatic tire body having a right sidewall, a left sidewall opposite the right sidewall, and an outer surface joining the right sidewall to the left sidewall; and
a plurality of paddles integrally joined to the outer surface of the tire body at discrete intervals around a circumference of the tire body, the plurality of paddles comprising left-side paddles and right-side paddles, wherein the plurality of paddles alternates between left-side paddles and right-side paddles around the circumference of the tire body;
wherein each right-side paddle extends transversely across the outer surface of the tire body, a right portion of the right-side paddle adjacent the right sidewall of the tire body having a first height and a left portion of the right-side paddle distal to the right sidewall of the tire body having a second height less than the first height;
wherein each left-side paddle extends transversely across the outer surface of the tire body, a left portion of the left-side paddle adjacent the left sidewall of the tire body having a first height and a right portion of the left-side paddle distal to the left sidewall of the tire body having a second height less than the first height; and
wherein the paddle tire has greater traction when rotating in a first direction than when rotating in a second direction opposite the first direction.

5. The paddle tire of claim 4, wherein a centerline of each right-side paddle and of each left-side paddle is offset from a centerline of the tire body.

6. The paddle tire of claim 4, wherein each paddle of the plurality of paddles is separated from adjacent paddles.

7. The paddle tire of claim 4, wherein the right portion of the right-side paddle is longer than the left portion of the right-side paddle and wherein the left portion of the left-side paddle is longer than the right portion of the left-side paddle.

8. The paddle tire of claim 4, wherein each paddle of the plurality of paddles comprises a scoop portion with a concave curved surface.

9. The paddle tire of claim 4, wherein the second height of the right-side paddle is less than or equal to half of the first height of the right-side paddle, and the second height of the left-side paddle is less than or equal to half of the first height of the left-side paddle.

10. The paddle tire of claim 4, wherein the right portion of the right-side paddle is at least twice as long as the left portion of the right-side paddle, and the left portion of the left-side paddle is at least twice as long as the right portion of the left-side paddle.

11. A paddle tire, comprising:
a pneumatic tire body having a first sidewall, a second sidewall opposite the first sidewall, and an outer surface joining the first sidewall to the second sidewall; and
a plurality of paddles bonded to the outer surface of the tire body around a circumference of the tire body, the plurality of paddles comprising left-side paddles and right-side paddles;
wherein each right-side paddle extends over the outer surface of the tire body, a first portion of the right-side paddle adjacent the first sidewall of the tire body having a first height and a second portion of the right-side paddle distal to the first sidewall of the tire body having a second height different from the first height; and
wherein each left-side paddle extends over the outer surface of the tire body, a first portion of the left-side paddle adjacent the second sidewall of the tire body having a first height and a second portion of the left-side paddle distal to the second sidewall of the tire body having a second height different from the first height.

12. The paddle tire of claim 11, wherein the plurality of paddles alternates between left-side paddles and right-side paddles around the circumference of the tire body.

13. The paddle tire of claim 11, wherein each paddle of the plurality of paddles extends transversely across the outer surface of the tire body.

14. The paddle tire of claim 11, wherein the second height of the right-side paddle is less than the first height of the right-side paddle, and the second height of the left-side paddle is less than the first height of the left-side paddle.

15. The paddle tire of claim 11, wherein a centerline of each right-side paddle and of each left-side paddle is offset from a centerline of the tire body.

16. The paddle tire of claim 11, wherein the first portion of the right-side paddle is longer than the second portion of the right-side paddle and wherein the first portion of the left-side paddle is longer than the second portion of the left-side paddle.

17. The paddle tire of claim 11, wherein each paddle of the plurality of paddles comprises a scoop portion with a concave curved surface.

18. The paddle tire of claim 11, wherein the second height of the right-side paddle is less than or equal to half of the first height of the right-side paddle, and the second height of the left-side paddle is less than or equal to half of the first height of the left-side paddle.

19. The paddle tire of claim 11, wherein the first portion of the right-side paddle is at least twice as long as the second portion of the right-side paddle, and the first portion of the left-side paddle is at least twice as long as the second portion of the left-side paddle.

* * * * *